US012043057B2

(12) United States Patent
Santoro

(10) Patent No.: US 12,043,057 B2

(45) Date of Patent: Jul. 23, 2024

(54) PROCESS FOR THE MANUFACTURING OF A SUPPORTING SURFACE FOR FURNISHING ACCESSORIES AND SUPPORTING SURFACE

(71) Applicant: GEM S.R.L, Modena (IT)

(72) Inventor: Biagio Santoro, Modena (IT)

(73) Assignee: GEM S.R.L, Modena (IT)

( * ) Notice: Subject to any disclaimer, the term of this patent is extended or adjusted under 35 U.S.C. 154(b) by 0 days.

(21) Appl. No.: 17/603,474

(22) PCT Filed: Apr. 14, 2020

(86) PCT No.: PCT/IB2020/053495

§ 371 (c)(1),
(2) Date: Oct. 13, 2021

(87) PCT Pub. No.: WO2020/212837

PCT Pub. Date: Oct. 22, 2020

(65) Prior Publication Data

US 2022/0176730 A1 Jun. 9, 2022

(30) Foreign Application Priority Data

Apr. 16, 2019 (IT) ........................ 102019000005880

(51) Int. Cl.

| | |
|---|---|
| ***B44C 1/175*** | (2006.01) |
| ***B44C 5/04*** | (2006.01) |
| ***B44F 9/04*** | (2006.01) |

(52) U.S. Cl.

CPC .......... *B44C 1/1758* (2013.01); *B44C 5/0453* (2013.01); *B44F 9/04* (2013.01); *B05D 2203/30* (2013.01)

(58) Field of Classification Search

CPC ................................ B44C 1/1758; B28B 1/26

See application file for complete search history.

(56) References Cited

FOREIGN PATENT DOCUMENTS

| | | | | |
|---|---|---|---|---|
| WO | WO-2018142028 A1 * | 8/2018 | ............... | B28B 1/26 |
| WO | WO2018/142028 * | 9/2018 | ............. | C04B 33/04 |

OTHER PUBLICATIONS

Mussi, Bisque Cutting, 2015, Ceramic Dictionary, pp. 1-2 (Year: 2015).*

Finkelburg, Cooling, Ceramic Recipes, 2010, pp. 1-5 (Year: 2010).*

E1, Roughness of Ceramic Tile, 2023, p. 1 (Year: 2023).*

* cited by examiner

*Primary Examiner* — Dah-Wei D. Yuan
*Assistant Examiner* — Andrew J Bowman

(57) ABSTRACT

The process for the manufacturing of a supporting surface for furnishing accessories, in particular for tables and tops for kitchens and/or bathrooms, comprises the phases of:

I providing a raw slab (2) made of raw ceramic material;

II firing the raw slab (2) to obtain a fired slab (5);

III modeling the fired slab (5) to obtain a shaped slab (6) comprising an exposed surface (8) and a lateral surface (9) transverse to the exposed surface (8);

IV decorating the shaped slab (6) with ceramic pigments (12) to obtain a decorated slab (13) which is decorated on said lateral surface (9);

V firing the decorated slab (13) and the ceramic pigments (12) to obtain a supporting surface (1) for furnishing accessories.

10 Claims, 2 Drawing Sheets

PROCESS FOR THE MANUFACTURING OF A SUPPORTING SURFACE FOR FURNISHING ACCESSORIES AND SUPPORTING SURFACE

RELATED APPLICATIONS

This application is a National Phase of PCT Patent Application No. PCT/IB2020/053495 having International filing date of Apr. 14, 2020, which claims the benefit of priority of Italy Patent Application No. 102019000005880 filed on Apr. 16, 2019. The contents of the above applications are all incorporated by reference as if fully set forth herein in their entirety.

FIELD AND BACKGROUND OF THE INVENTION

The present invention relates to a process for the manufacturing of a supporting surface for furnishing accessories, in particular for tables and tops for kitchens and/or bathrooms.

It is well known that supporting surfaces for furnishing accessories can be made of different materials and through different industrial processes.

The supporting surfaces for furnishing accessories can be made of natural material (e.g. marble, granite, wood) which are suitably shaped according to the dimensional characteristics of the supporting surface to be made.

In this regard, it should be noted that the supporting surfaces have different dimensions and conformation depending on their intended use and often comprise storage compartments to receive any additional furnishing components (e.g. sinks, hobs, or the like).

The supporting surfaces made of natural materials do however have some drawbacks, including the fact that they do not always meet market requirements because they are often very expensive.

Secondly, the supporting surfaces made of natural material do not have an appreciable durability in terms of shock-proof and in terms of permeability to any staining agents.

As an alternative to natural materials, it is well known to manufacture supporting surfaces with material of the type of resins or mixtures of resins and synthetic quartzes, which can be, e.g., okite, corian, laminate, or the like.

However, the supporting surfaces made with the above mentioned materials do have some drawbacks and, specifically, they often do not meet the aesthetic standards required by customers, as they hardly ever faithfully reproduce the aesthetics of natural materials.

Furthermore, the use of supporting surfaces made of ceramic material and, in particular, porcelain stoneware is well known.

Porcelain stoneware is a ceramic product obtained by means of a process implemented in the ceramic industry that involves the processing of a basic material of a ceramic nature.

The basic material has different characteristics and composition according to the nature of the finished product to be obtained and, precisely, it can be composed of clays, silicates, minerals in granular form (e.g. marble and granite), quartz powders, resins and the like.

The process implemented to obtain porcelain stoneware involves first of all distributing the basic material on a special flat support in order to obtain a layer of basic material.

The layer thus obtained is compacted, decorated on the exposed surface, for example, through the application of ceramic pigments by means of digital printing, and then fired.

The porcelain stoneware obtained this way takes the form of large-size slabs which are then shaped to obtain the supporting surface and, specifically, are cut and, if necessary, bevelled at the edges.

The supporting surfaces made of porcelain stoneware do however have some drawbacks.

First of all, the table tops made of porcelain stoneware do not always meet customers' aesthetic requirements because, for example, they do not reproduce the aesthetic characteristics of natural materials in a satisfactory manner.

In this regard, it should be noted that the natural materials often have veins of colour distributed through the thickness of the natural materials themselves.

To best imitate the aforementioned veins of colour, during the production process of porcelain stoneware, the basic material is sometimes deposited on the flat support so as to create different layers by colour and composition, which extend throughout the entire thickness of the supporting surface.

This way, what is commonly known as "full-body decoration" is obtained.

However, even the supporting surfaces made with full-body porcelain stoneware often have transverse surfaces that comprise veins of colour that do not faithfully reproduce the veins present in the natural materials.

In fact, while the main faces of the supporting surfaces can be decorated with high detailed precision using digital printing so as to depict realistic veins, the transverse surfaces cannot be decorated with digital printers and, therefore, do have veins of poorer aesthetic quality.

In addition to this, the supporting surfaces made of porcelain stoneware often have surface imperfections generated during the cutting of porcelain stoneware slabs, such as, e.g., microgrooves and pores inside of which dirt can be deposited.

SUMMARY OF THE INVENTION

The main aim of the present invention is to devise a process for the manufacturing of a supporting surface for furnishing accessories, in particular for tables and tops for kitchens and/or bathrooms, that allows obtaining supporting surfaces that are more aesthetically appreciable by customers.

Within the scope of this aim, a further object of the present invention is to devise a process for the manufacturing of a supporting surface for furnishing accessories, in particular for tables and tops for kitchens and/or bathrooms, which makes it possible to manufacture supporting surfaces that perfectly resemble natural materials.

Yet, another object of the present invention is to devise a process for the manufacturing of a supporting surface for furnishing accessories, in particular for tables and tops for kitchens and/or bathrooms that allows obtaining supporting surfaces which are impermeable to dirt and easily cleaned.

Another object of the present invention is to devise a process for the manufacturing of a supporting surface for furnishing accessories, in particular for tables and tops for kitchens and/or bathrooms that allows obtaining supporting surfaces the cost of which is as low as possible.

Another object of the present invention is to devise a process for the manufacturing of a supporting surface for furnishing accessories, in particular for tables and tops for kitchens and/or bathrooms that allows overcoming the above mentioned drawbacks of the prior art in a simple, rational, easy, effective to use and low cost solution.

The objects set out above are achieved by the present process for the manufacturing of a supporting surface for furnishing accessories, in particular for tables and tops for kitchens and/or bathrooms having the characteristics of claim 1.

The objects set out above are also achieved by the present process for the manufacturing of a supporting surface for furnishing accessories, in particular for tables and tops for kitchens and/or bathrooms, having the characteristics of claim 12.

BRIEF DESCRIPTION OF THE SEVERAL VIEWS OF THE DRAWINGS

Other characteristics and advantages of the present invention will be more evident from the description of a preferred, but not exclusive, embodiment of a process for the manufacturing of a supporting surface for furnishing accessories, in particular for tables and tops for kitchens and/or bathrooms, illustrated by way of an indicative, yet not limiting example, in the attached tables of drawings in which.

DESCRIPTION OF SPECIFIC EMBODIMENTS OF THE INVENTION

With particular reference to these figures by reference letter I, II, III, IV, V are indicated the main phases of the process according to the invention, with which it is possible to obtain the supporting surface 1 for furnishing accessories according to the invention.

In the context of the present discussion, it is considered that the supporting surface 1 manufactured according to the process which the present invention relates to, is used in particular in the manufacturing of tables or as a worktop for kitchens and bathrooms.

Alternative embodiments cannot however be ruled out in which the process which the present invention relates to, is implemented in order to manufacture a supporting surface 1 intended for a different use, such as e.g. staircase or landing surfaces.

The supporting surface 1 is made of ceramic material, preferably porcelain stoneware.

It should be noted that porcelain stoneware has low water permeability and, therefore, is frost-resistant and poorly stained.

The supporting surface 1 made of porcelain stoneware, therefore, is particularly suitable to be inserted in environments such as kitchens and bathrooms, or to be placed outside buildings in case it is used for the construction of outdoor tables.

Alternative embodiments cannot be ruled out in which the process which the present invention relates to, is implemented for the manufacturing of a supporting surface 1 made of a material other than porcelain stoneware, e.g. ceramic or terracotta.

Figure 1:
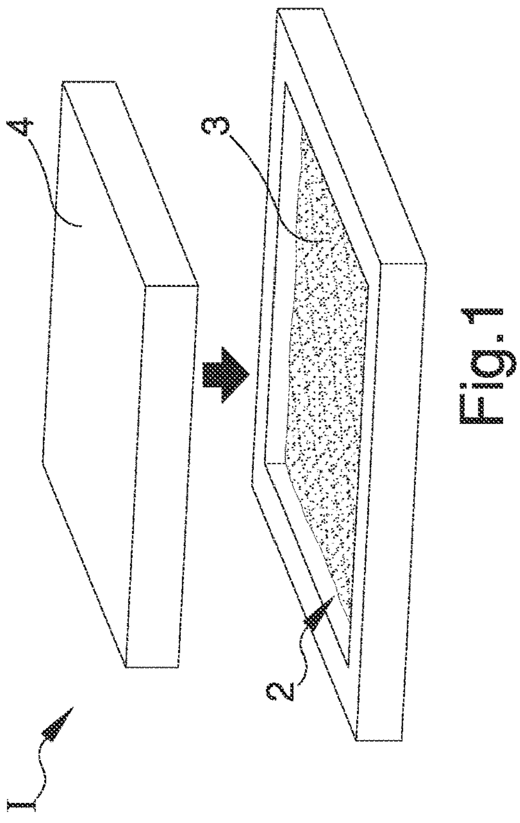
FIG. 1 is an axonometric view that illustrates the phase of providing the raw slab provided by the process according to the invention.

The phase I of the process according to the invention is shown in FIG. 1 and consists in providing at least one raw slab 2 made of raw ceramic material.

The raw slab 2 is obtained, for example, through a process, schematically shown in FIG. 1, which involves distributing a ceramic basic material 3 of a powdery nature on a flat support and then compacting the layer thus formed to obtain the raw slab 2.

In the context of the present discussion, the compaction of the basic material 3 is considered to be carried out, e.g., using a press 4.

Alternative embodiments cannot however be ruled out in which the compaction of the basic material is carried out using different types of machinery, e.g. by means of rolling means.

Figure 2:
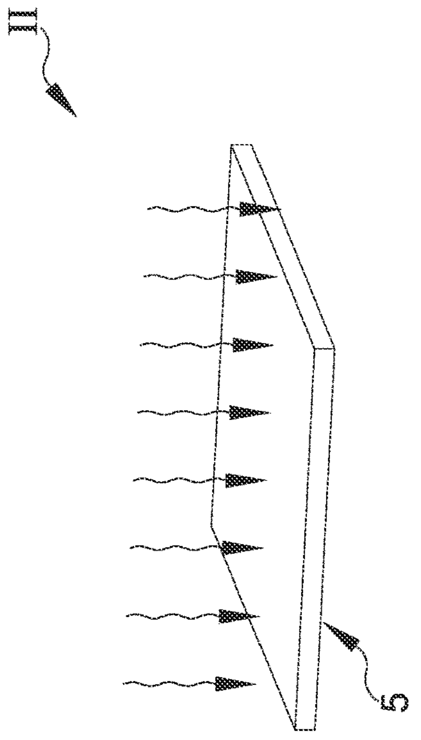
FIG. 2 is an axonometric view that illustrates the phase of firing the raw slab provided by the process according to the invention.

The phase II of the process is shown in FIG. 2 and consists in firing at least partly the raw slab 2 to obtain at least one fired slab 5.

During the phase II of the process according to the invention it is provided to convey on the raw slab 2 heat that favours the compaction of the basic material 3 thus obtaining the fired slab 5.

The raw slab 2 is conveniently fired in special kilns where the temperature is between 800° C. and 1250° C., for example.

Figure 3:
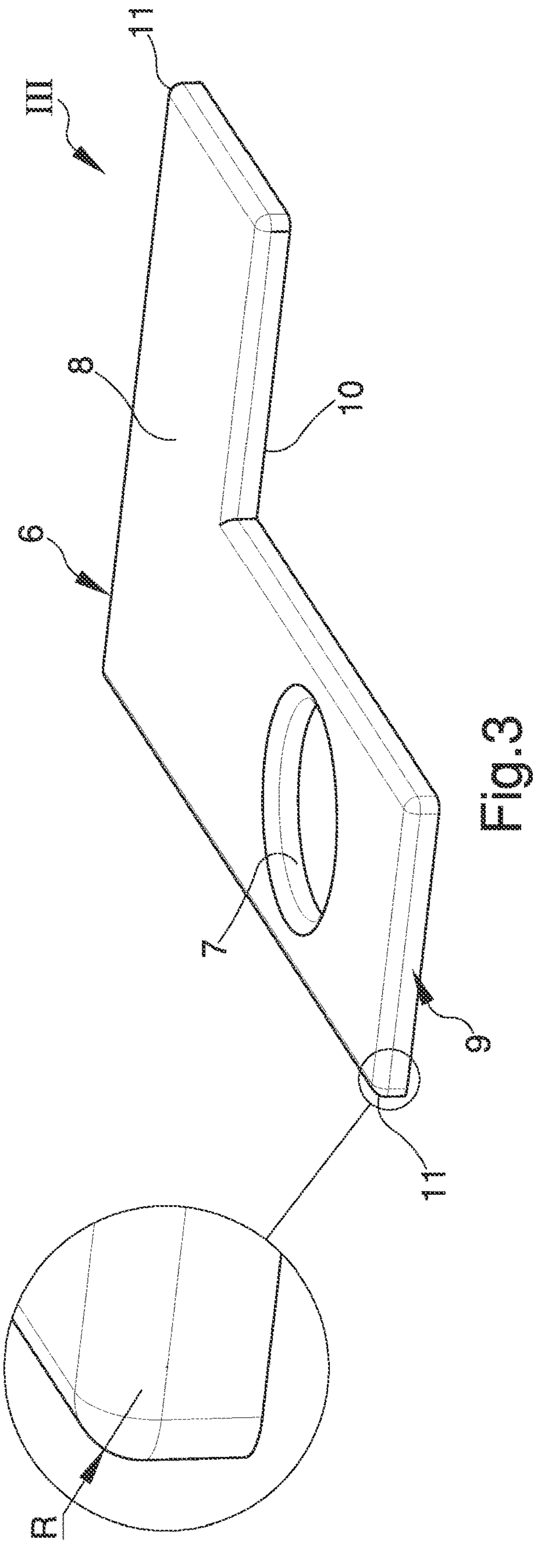
FIG. 3 is an axonometric view that illustrates the phase of modelling the fired slab provided by the process according to the invention.

The phase III of the process is shown in FIG. 3 and consists in modelling at least partly the fired slab 5 to obtain at least one shaped slab 6.

The supporting surface 1, depending on its intended use, must have dimensions and shape adaptable to the characteristics of the environment in which it is installed.

For example, the supporting surfaces 1 to be installed in kitchens or bathrooms must adapt to the dimensions of the other furniture already present and, often, must contain additional furnishing components such as washbasins or hobs.

The fired slab 5 obtained during the phase II of the process often has a substantially rectangular shape and extends over very large areas, which do not suit the dimensional characteristics required for the supporting surfaces 1.

In this respect, it is necessary to change the shape of the fired slab 5 and reduce the dimension thereof to obtain the shaped slab 6.

The phase III involves cutting the fired slab 5 in order to shape it according to the dimensional characteristics of the supporting surface 1 to be obtained.

In the particular embodiment shown in the figures, the shaped slab 6 is substantially L-shaped and comprises a storage compartment 7 for an additional furnishing component (a washbasin).

Alternative embodiments cannot be ruled out in which the shaped slab 6 has a different shape; the shaped slab 6 may e.g. have a substantially circular shape and/or comprise two storage compartments 7.

The shaped slab 6 comprises at least one exposed surface 8 and at least one lateral surface 9 transverse to the exposed surface 8.

Conveniently, the shaped slab 6 comprises a laying surface 10 opposite the exposed surface 8, the lateral surface 9 extending between the exposed surface 8 and the laying surface 10.

When using the supporting surface 1 obtained by means of the process according to the invention, it is planned to allocate it in the room of destination so that the laying surface 10 is not visible to the outside and faces downwards.

The exposed surface 8, on the other hand, is visible and facing upwards during normal use of the supporting surface 1.

In the particular embodiment shown in the figures there is a plurality of lateral surfaces 9 with a substantially straight extension.

Alternative embodiments cannot however be ruled out in which the lateral surfaces 9 have different conformation.

Advantageously, the lateral surfaces 9 comprise at least one connecting stretch 11 with the exposed surface 8.

During the modelling phase, the sharp edges between the exposed surface 8 and the lateral surfaces 9 are eliminated and, specifically, the connecting stretch 11 is created with a substantially curvilinear extension.

The presence of the connecting stretch 11 reduces the angularity of the shaped slab 6 making it easier to handle and facilitating the subsequent phases of the process according to the invention (as it will be better explained later).

The connecting stretch 11 conveniently has a radius of curvature R ranging from 0.1 mm to 50 mm.

Figure 4:
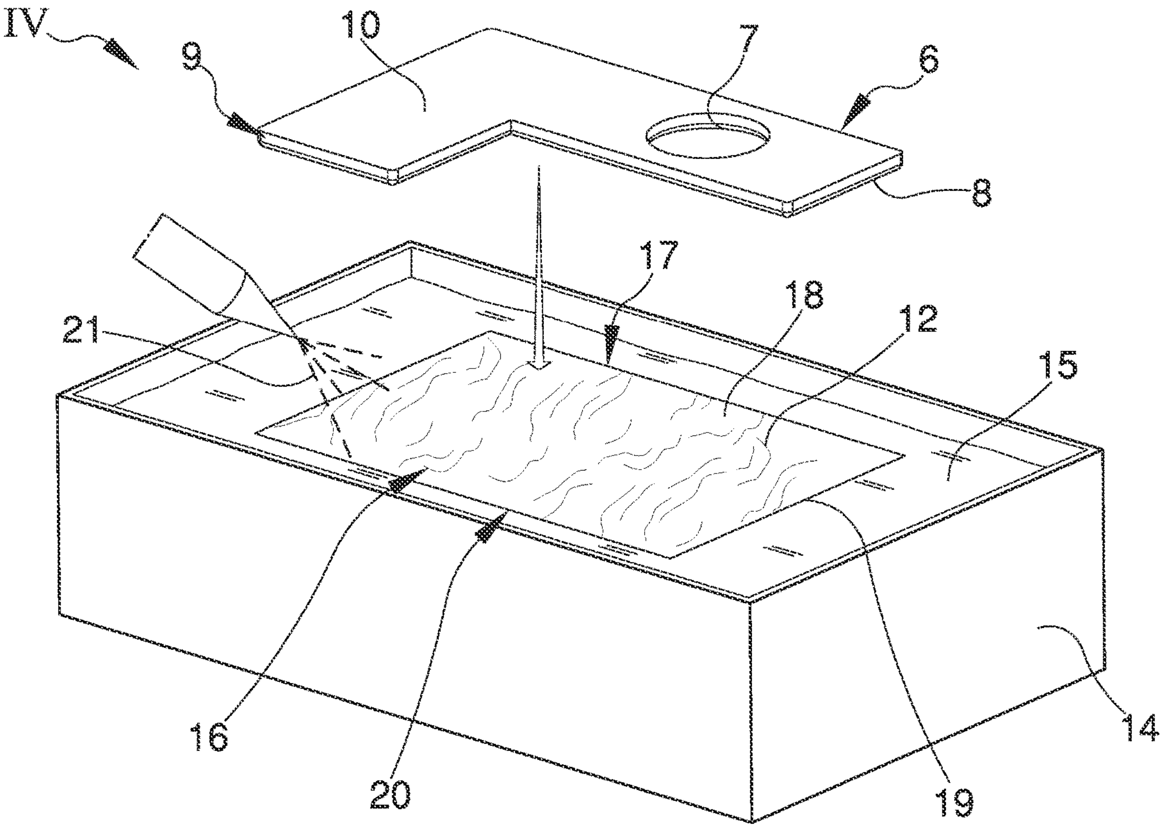
FIG. 4 is an axonometric view that illustrates the phase of decorating the shaped slab provided by the process according to the invention.

The phase IV of the process is shown in FIG. 4 and involves decorating the shaped slab 6 with ceramic pigments 12 to obtain at least one decorated slab 13 which is decorated at least partly on the lateral surface 9.

Conveniently, the phase of decorating IV consists of a hydrographic decoration. The hydrographic decoration IV comprises at least the sub-phases of:

- providing at least one container 14 containing at least one floating liquid 15;
- distributing the ceramic pigments 12 on the free surface of the floating liquid 15 to obtain at least an overflow decoration 16.

The floating liquid 15 is preferably water.

The ceramic pigments 12 are mixtures of very fine grain size colouring particles which, for example, are dispersed in a liquid solution which conveys the ceramic pigments 12 themselves.

The mixture containing the liquid solution and the ceramic pigments 12 is commonly known as ceramic ink.

The ceramic ink is distributed on the free surface of the floating liquid 15 according to a predetermined pattern, which varies according to the appearance that the supporting surface 1 must have.

The ceramic pigments 12 remain in suspension on the free surface of the floating liquid 15, without dispersing, thus defining the overflow decoration 16, i.e. a floating pattern.

The sub-phase of distributing the ceramic pigments 12 usefully comprises at least the steps of:

- providing at least one film element 17 comprising at least one first face 18 and at least one second face 19 opposite each other;
- applying the ceramic pigments 12 at least partly on the first face 18 to obtain at least one decorative element 20 comprising the film element 17 and the overflow decoration 16;
- placing the decorative element 20 on the floating liquid 15, in which at least one of the first face 18 and the second face 19 is arranged on the free surface of the floating liquid 15 and the decorative element 20 floats on the floating liquid 15;
- dissolving the film element 17 by means of at least one reagent substance 21.

In the particular embodiment shown in the figures, the film element 17 is substantially a polyvinyl alcohol-based hydrographic sheet.

The ceramic pigments 12 are distributed on the first face 18 according to a pre-established pattern, corresponding to the overflow decoration 16 one wishes to obtain.

The decorative element 20 thus obtained is placed on the free surface of the floating liquid 15; in the particular embodiment shown in the figures, the second face 19 directly contacts the free surface of the floating liquid 15 and, therefore, the first face 18 remains facing upwards.

Alternative embodiments cannot however be ruled out in which the decorative element 20 is placed on the floating liquid 15 so that the first face 18 directly contacts the free surface of the floating liquid 15, with the second face 19 facing upwards.

Subsequently, the reagent substance 21 is distributed on the decorative element 20 and reacts with the film element 17 by dissolving it, leaving in suspension on the floating liquid 15 only the overflow decoration 16 which, on the contrary, does not react with the reagent substance 21.

In the particular embodiment shown in the figures the reagent substance 21 is a liquid that is sprayed on the decorative element 20.

Alternative embodiments cannot however be ruled out in which the reagent substance 21 is of a different nature; for example, the reagent substance 21 may be of a solid nature and be dissolved in the floating liquid 15 or be of a gaseous nature and be diffused directly on the decorative element 20.

Furthermore, it cannot also be ruled out that the film element 17 may be made of a material with a high degree of water solubility and adapted to dissolve in contact with water, which therefore acts both as a floating liquid 15 and as a reagent substance 21.

The hydrographic decoration phase IV usefully comprises at least the sub-phases of:

- inserting the shaped slab 6 in the container 14, the overflow decoration 16 being adapted to adhere at least to the lateral surface 9 to obtain the decorated slab 13;
- removing the decorated slab 13 from the container 14.

During the sub-phase of inserting the shaped slab 6 in the container, the exposed surface 8 is placed on the free surface of the floating liquid 15 in a centred position with respect to the overflow decoration 16.

The presence of the connecting stretch 11 conveniently helps to maintain the surface continuity of the overflow decoration 16.

The insertion of the shaped slab 6 in the container results in an increase in the hydrostatic pressure of the floating liquid 15 which exerts a force on the overflow decoration 16 which is pressed onto the shaped slab 6.

Thanks to the surface tension of the floating liquid 15, the overflow decoration 16 contacts the lateral surfaces 9 adhering thereto.

In the particular embodiment shown in the figures, the overflow decoration 16 extends so as to adhere not only to the lateral surfaces 9 but also to the exposed surface 8.

In practice, the overflow decoration 16 is impressed on the exposed surface 8 and on the lateral surfaces 9 without interruption.

Advantageously, at least one of the exposed surface 8 and the lateral surface 9, preferably both, has a roughness ranging from 2 μm to 50 μm.

This feature favours the adhesion of the overflow decoration 16 to the exposed surface 8 and to the lateral surfaces 9.

The desired level of roughness can be obtained, if necessary, during the phase of modelling III of the fired slab 5.

Conveniently, the phase of decorating IV may comprise the phase of applying at least one coating layer on at least one portion of the shaped slab 6.

The object of the coating layer is to help the adhesion of the overflow decoration 16 to the surfaces to be decorated and to allow better control of the colour development of the overflow decoration 16 itself.

The coating layer is preferably waterproof.

Figure 5:
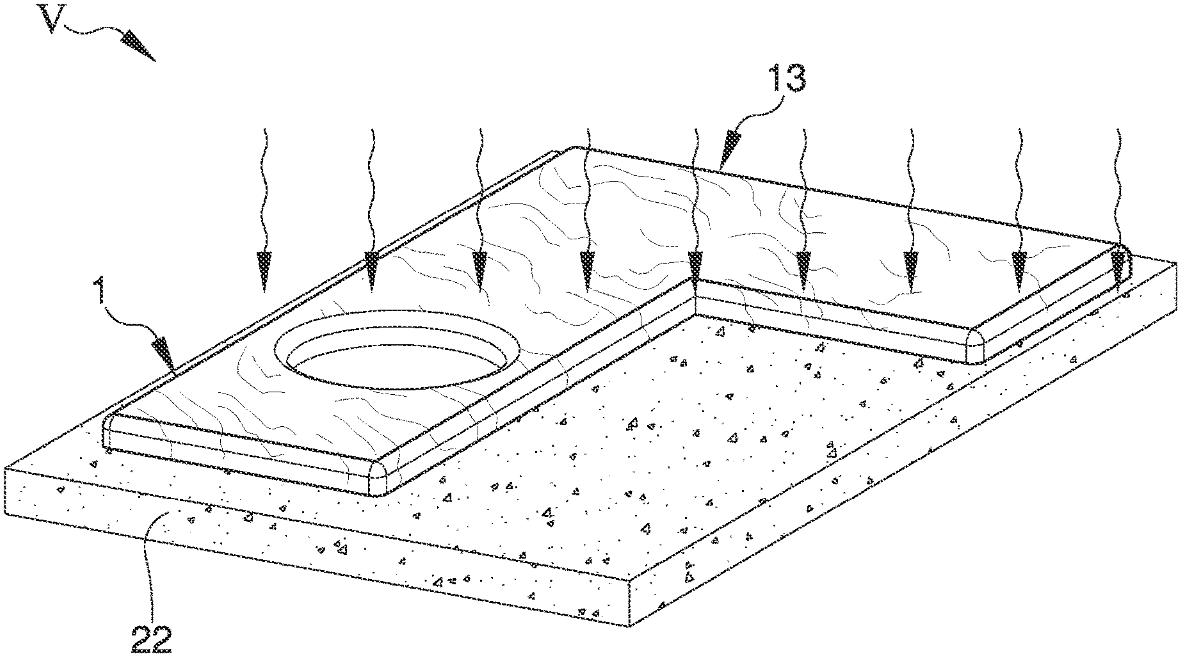
FIG. 5 is an axonometric view that illustrates the phase of firing the decorated slab provided by the process according to the invention.

The phase V of the process is shown in FIG. 5 and involves firing the decorated slab 13 and the ceramic pigments 12 to obtain the supporting surface 1 for furnishing accessories.

During the phase V of the process according to the invention it is provided to convey heat on the decorated slab 13 in order to fire both the decorated slab 13 and the ceramic pigments 12.

The firing of the decorated slab 13 takes place, e.g., inside special kilns where the temperature ranges from 800° to 1250° C.

Preferably, the temperature of the phase V is different from the temperature of the phase II; for example, the phase II occurs at a high temperature (ranging from 1000° C. to 1250° C., preferably 1200° C.), while the phase V occurs at a lower temperature (ranging from 800° C. to 1000° C., preferably 900° C.).

It cannot however be ruled out that the phase II may occur at a lower temperature than the temperature at which the phase V occurs.

Conveniently, the firing phase of the decorated slab 13 comprises the sub-phase of placing the decorated slab 13 on at least one holding surface 22.

In this regard, it should be noted that the decorated slab 13 may also show a very complex conformation as a result of the modelling carried out in the phase II and, therefore, may have poor resistance to shock and vibration and may be damaged during the movement thereof.

When placed on the holding surface 22, on the other hand, the decorated slab 13 distributes its weight evenly on the holding surface 22, thus facilitating the movement thereof and reducing the risk of breakage.

Conveniently, the decorated slab 13 is placed on the holding surface 22 which rests on the laying surface 10 and with the exposed surface 8 facing upwards. Advantageously, the phase of firing the decorated slab 13 comprises the sub-phases of:

heating the decorated slab 13 and the holding surface 22;

cooling the holding surface 22, the decorated slab 13 being adapted to be cooled by heat exchange with the holding surface 22.

The cooling of the holding surface 22 is achieved by conveying a flow of cold air on the holding surface 22.

Advantageously, the holding surface 22 is made of a refractory material with a very high thermal inertia, which thus favours the gradual cooling of the holding surface 22 and, consequently, of the decorated slab 13.

The decorated slab 13 is very sensitive to temperature changes, especially in the areas where there is a narrowing of the exposed surface 8 due, for example, to the presence of the storage compartments 7.

Thanks to the presence of the holding surface 22, the cooling of the decorated slab 13 takes place gradually, thus avoiding any breakage of the decorated slab 13 due to thermal shock.

Advantageously, the process according to the invention may comprise, after the phase of decorating and before the phase of firing the decorated slab 13, the phase of applying at least one protective layer of ceramic glaze on at least one of the exposed surface 8 and the lateral surface 9.

The phase of applying at least one ceramic protective layer is not shown in the figures.

The protective layer of ceramic glaze is a substance in the liquid or solid state (e.g. grit) which is applied to the decorated slab 13 to protect from scratches and shocks the overflow decoration 16 impressed on the same decorated slab 13 during the process according to the invention.

The protective layer of ceramic glaze also gives gloss to the decorated slab 13.

The protective layer of ceramic glaze is then fixed to the outer surface of the decorated slab 13 during the phase V of the process.

In the event of the application of the protective layer of ceramic glaze being provided, the process may also comprise the phase of smoothing at least in part the supporting surface 1.

The smoothing phase is not shown in the figures and consists in partially removing the material present on the exposed surface 8 and/or on the lateral surfaces 9 in order to give a higher level of gloss to the supporting surface 1.

As an alternative to the smoothing phase, the process may comprise, after the phase of firing the decorated slab 13, the phase of lapping at least part of the supporting surface 1.

The phase of lapping is not shown in the figures and consists of partly reducing the roughness of the exposed surface 8 and/or of the lateral surfaces 9 in order to eliminate any surface imperfections that may make the supporting surface 1 imperfect to the eye and to the touch.

Specifically, during the lapping phase, it is envisaged to move on the supporting surface 1, the lapping means (e.g. a grinding wheel) on the exposed surface 8 and on the lateral surfaces 9.

Advantageously, the process according to the invention may also comprise a phase of applying at least one decoration on the raw slab 2.

The phase of applying the decoration is not shown in the figures and involves applying coloured pigments on the raw slab 2, e.g. by digital printing, to obtain the desired decoration and then fixing them by means of the phase of partly firing the raw slab 2.

In other words, the phase of hydrographic decoration IV can be applied to virgin, i.e. not yet decorated, shaped slabs 6 or to shaped slabs 6 that have already been partly decorated on the exposed surface 8.

It has in practice been ascertained that the described invention achieves the intended objects and in particular it is underlined that the process which the present invention relates to, allows obtaining a supporting surface for furnishing accessories with an aesthetic appearance very similar to those of natural materials. In particular, thanks to the phase of decorating it is possible to decorate the lateral surfaces of the supporting surface and to obtain a homogeneous and continuous decoration between the exposed surface and the lateral surfaces, thus making the supporting surface as similar as possible to natural materials.

The invention claimed is:

1. A process for the manufacturing of a supporting surface for furnishing accessories, wherein said process comprises the phases of:

I providing at least one raw slab (2) made of raw ceramic material;

II firing at least part of said raw slab (2) to obtain at least one fired slab (5);

III modeling at least part of said fired slab (5) to obtain at least one shaped slab (6) comprising at least one exposed surface (8) and at least one lateral surface (9) transverse to said exposed surface (8);

IV decorating said shaped slab (6) with ceramic pigments (12) to obtain at least one decorated slab (13) which is decorated at least partly on said lateral surface (9);

V firing said decorated slab (13) and said ceramic pigments (12) to obtain at least one supporting surface (1) for furnishing accessories;

wherein said phase of decorating (IV) consists of a hydrographic decoration.

2. The process according to claim 1, wherein said hydrographic decoration (IV) comprises at least the sub-phases of:

providing at least one container (14) containing at least one floating liquid (15);

distributing said ceramic pigments (12) on a free surface of said floating liquid (15) to obtain at least one overflow decoration (16);

inserting said shaped slab (6) in said container (14), said overflow decoration (16) being adapted to adhere at least to said lateral surface (9) to obtain said decorated slab (13);

removing said decorated slab (13) from said container (14).

3. The process according to claim 1, wherein said hydrographic decoration (IV) comprises the phase of applying at least one coating layer on at least one portion of said shaped slab (6).

4. The process according to claim 2, wherein said sub-phase of distributing said ceramic pigments (12) comprises at least the steps of:

providing at least one film element (17) comprising at least one first face (18) and at least one second face (19) opposite each other;

applying said ceramic pigments (12) at least partly on said first face (18) to obtain at least one decorative element (20) comprising said film element (17) and said overflow decoration (16);

placing said decorative element (20) on said floating liquid (15), in which at least one of said first face (18) and said second face (19) is arranged on the free surface of said floating liquid (15) and said decorative element (20) floats on said floating liquid (15);

dissolving said film element (17) by means of at least one reagent substance (21).

5. The process according to claim 1, wherein said lateral surface (9) comprises at least one connecting stretch (11) for connecting with said exposed surface (8).

6. The process according to claim 5, wherein said connecting stretch (11) has a radius of curvature (R) ranging from 0.1 mm to 50 mm.

7. The process according to claim 1, wherein at least one of said exposed surface (8) and said lateral surface (9) has a roughness ranging from 2 μm to 50 μm.

8. The process according to claim 1, wherein said process comprises, after said phase of decorating (IV) and before said phase of firing (V) said decorated slab (13), the phase of applying at least one protective layer of ceramic glaze on at least one of said exposed surface (8) and said lateral surface (9).

9. The process according to claim 1, wherein said process comprises a phase of applying at least one decoration on said raw slab (2).

10. The process according to claim 1, wherein said phase of firing (V) said decorated slab (13) comprises the sub-phases of:

placing said decorated slab (13) on at least one holding surface (22);

heating said decorated slab (13) and said holding surface (22);

cooling said holding surface (22), said decorated slab (13) being adapted to be cooled by heat exchange with said holding surface (22).

* * * * *